(12) United States Patent
Huang et al.

(10) Patent No.: US 8,732,268 B2
(45) Date of Patent: May 20, 2014

(54) GLOBAL TRAFFIC MANAGEMENT USING MODIFIED HOSTNAME

(75) Inventors: Cheng Huang, Redmond, WA (US); Ivan Ivanov Batanov, Bellevue, WA (US); Jin Li, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 170 days.

(21) Appl. No.: 13/090,022

(22) Filed: Apr. 19, 2011

(65) Prior Publication Data
US 2012/0271909 A1 Oct. 25, 2012

(51) Int. Cl.
*G06F 15/16* (2006.01)
(52) U.S. Cl.
USPC ............ 709/217; 709/219; 709/224; 709/225
(58) Field of Classification Search
USPC .......................................................... 709/217
See application file for complete search history.

(56) References Cited

U.S. PATENT DOCUMENTS

| | | | |
|---|---|---|---|
| 6,351,775 B1 | 2/2002 | Yu | |
| 6,405,252 B1* | 6/2002 | Gupta et al. | 709/224 |
| 6,754,706 B1* | 6/2004 | Swildens et al. | 709/225 |
| 7,822,839 B1 | 10/2010 | Pruitt et al. | |
| 7,822,871 B2* | 10/2010 | Stolorz et al. | 709/238 |
| 2002/0052942 A1* | 5/2002 | Swildens et al. | 709/223 |
| 2004/0221019 A1* | 11/2004 | Swildens et al. | 709/217 |
| 2005/0097445 A1* | 5/2005 | Day et al. | 715/501.1 |
| 2009/0089438 A1 | 4/2009 | Agarwal et al. | |
| 2009/0094176 A1* | 4/2009 | Williams et al. | 706/12 |
| 2009/0327489 A1* | 12/2009 | Swildens et al. | 709/224 |
| 2010/0138488 A1* | 6/2010 | Fletcher et al. | 709/203 |
| 2012/0110148 A1* | 5/2012 | Liu et al. | 709/220 |
| 2012/0179814 A1* | 7/2012 | Swildens et al. | 709/224 |

OTHER PUBLICATIONS

Internet Draft: Client Subnet in DNS request C. Contavalli; W. Van der Gaast (Google) S. Leach (Verisign) D. Rodden (Neustar) Jan. 27, 2011.*
Huang, et al., "A DNS Reflection Method for Global Traffic Management", Retrieved at <<http://www.usenix.org/event/atc10/tech/full_papers/Huang.pdf>>, Proceedings of the 2010 USENIX conference on USENIX annual technical conference, 2010, pp. 1-6.
Huang, et al., "Measuring and Evaluating Large-Scale CDNs", Retrieved at <<http://www.cs.brown.edu/courses/csci2950-u/papers/CDN-measuring-IMC08-huang.pdf>>, Oct. 20-22, 2008, 14 Pages.
Mao, et al., "A Precise and Efficient Evaluation of the Proximity between Web Clients and their Local DNS Servers", Retrieved at << http://chuck.cranor.org/p/dns-usenix.pdf>>, 2002, 14 Pages.

(Continued)

*Primary Examiner* — Tauqir Hussain
(74) *Attorney, Agent, or Firm* — Ben Tabor; Kate Drakos; Micky Minhas (57) ABSTRACT

A particular method includes receiving a request from a client at a server and sending a global traffic management identifier in response to the request from the client. The global traffic management identifier is determined based on an attribute of the client. In response to the client requesting access to a service based on a modified hostname of the service, a data center associated with the service is identified based on the modified hostname of the service. The modified hostname identifies the global traffic management identifier, and the identified data center is useable by the client to access the service.

20 Claims, 4 Drawing Sheets

(56) References Cited

OTHER PUBLICATIONS

Andrews, et al., "Clustering and Server Selection using Passive Monitoring", Retrieved at <<http://citeseerx.ist.psu.edu/viewdoc/download?doi=10.1.1.16.8296&rep=rep1&type=pdf>>, 2002, 9 Pages.

"BIG-IP® Global Traffic Manager™", Retrieved at <<http://www.f5.com/products/big-ip/global-traffic-manager.html>>, Feb. 15, 2011, 1 Page.

Shaikh, et al., "On the Effectiveness of DNS-based Server Selection", Retreived at<< http://citeseerx.ist.psu.edu/viewdoc/download;jsessionid=A3916A9D837C7B575B86C48ABCE42F33?doi=10.1.1.33.5294&rep=rep1&type=pdf>>, 2001, 9 Pages.

Pang, et al., "On the Responsiveness of DNS-based Network", Retrieved at <<Controlhttp://conferences.sigcomm.org/imc/2004/papers/p21-pang.pdf>>, Oct. 25-27, 2004, pp. 21-26.

Ballani, et al., "A Measurement-Based Deployment Proposal for IP Anycast", Retrieved at<<http://conferences.sigcomm.org/imc/2006/papers/p22-ballani.pdf http://conferences.sigcomm.org/imc/2006/papers/p22-ballani.pdf>>, Oct. 25-27, 2006, 14 Pages.

Oberheide, et al., "Characterizing Dark DNS Behavior", Retrieved at<<http://www.merit.edu/networkresearch/papers/pdf/2007/dark_dns.pdf>>, 2007, pp. 140-156.

Agarwal, et al., "Matchmaking for Online Games and Other Latency-Sensitive P2P Systems", Retrieved at<<http://research.microsoft.com/pubs/80856/sigcomm09-265.pdf>>, Aug. 17-21, 2009, 12 Pages.

Karger, et al., "Web caching with consistent hashing" Retreived at<< http://www.cs.brown.edu/courses/csci2950-u/f10/papers/chash99www.pdf>>, Proceedings of the eighth international conference on World Wide Web1999, 11 Pages.

Tariq, et al., "Answering What-If Deployment and Configuration Questions with WISE", Retrieved at <<http://www.gtnoise.net/papers/2008/tariq:wise:sigcomm08.pdf>>, Aug. 17-22, 2008, pp. 99-110.

"AWS CloudFront Resources", Retrieved at<< http://aws.amazon.com/cloudfront/#resources>>, Retrieved Date: Feb. 15, 2011, 1 Page.

Contavalli, et al., "Client IP information in DNS requests" Retrieved at << http://tools.ietf.org/pdf/draft-vandergaast-edns-client-ip-00.pdf>>, Jan. 26, 2010, 21 Pages.

Kohavi, et al., "Practical Guide to Controlled Experiments on the Web: Listen to your Customers not to the Hippo", Retrieved at<< http://citeseerx.ist.psu.edu/viewdoc/download?doi=10.1.1.141.474&rep=rep1&type=pdf >>, Aug. 12-15, 2007, pp. 1-9.

"Using DNS Reflection to Measure Network Performance", U.S. Appl. No. 12/769,270, filed Apr. 28, 2010, pp. 1-39.

* cited by examiner

GLOBAL TRAFFIC MANAGEMENT USING MODIFIED HOSTNAME

BACKGROUND

Internet services are often deployed in multiple geographically distributed locations, so that they can be close and deliver fast and responsive services to clients. To improve client performance, a particular data center may be dynamically determined for each individual user. By serving users from the particular data center (e.g. a data center close to a location of the client or a data center with low latency with respect to the client or an ISP of the client), content such as web search results, Internet videos, online gaming messages, and software updates may be delivered with low latency and high throughout while reducing network congestion. However, the "best" data center for a client may correlate poorly with geographic distance from the client. Instead, the "best" data center may be determined by a combination of network latency, packet loss, and available bandwidth. In addition, the identity of the "best" data center for a client may be dynamic and may change with Internet routes, service providers, and physical network connectivity.

SUMMARY

During an Internet session, a client may submit a domain name system (DNS) query of a particular hostname to a local DNS resolver (LDNS), which may be operated by the client's Internet service provider (ISP). The LDNS may interact with an authoritative name server to receive an answer to the client's DNS query and may forward the answer to the client. The LDNS may also cache the answer so that subsequent queries of the same hostname can be answered promptly (i.e. without a subsequent authoritative name server query. The LDNS caching may prevent unnecessary DNS queries against the authoritative name server and may speed up the DNS resolution process.

Typically, when the authoritative name server (e.g., global traffic management (GTM) server) receives a DNS query, the GTM server observes the origin (e.g., Internet protocol (IP) address) of the LDNS, rather than the IP address of the client. Therefore, the "best" data center determined by the GTM may be the "best" data center for the LDNS, not the client. In other words, the GTM server may be forced to use the LDNS as an approximation of the client.

Systems and methods of performing global traffic management using a modified hostname are disclosed. The techniques disclosed herein may improve network performance without modification to the LDNS and may scale as additional data centers are added. As described herein, the hostname of a desired service may be modified and augmented with a GTM identifier (GTM ID) before performing DNS resolution. GTM IDs may be client dependent but do not have to be unique for every client. The GTM ID may include sufficient information such that a "best" data center for a client may be selected solely on the basis of the GTM ID. For example, if all clients from a certain prefix map to a single data center, then the same GTM ID (e.g., an encoded string of the prefix) may be assigned to all of such clients. During DNS resolution, the GTM server may use the GTM ID embedded in the modified hostname to select a particular data center.

BRIEF DESCRIPTION OF THE DRAWINGS

The present disclosure may be better understood, and its numerous features and advantages made apparent to those skilled in the art by referencing the accompanying drawings.

The use of the same reference symbols in different drawings indicates similar or identical items.

DETAILED DESCRIPTION

In accordance with the techniques disclosed herein, a client may transmit an access request associated with a service to a server (e.g., an authoritative name server of a global traffic management (GTM) system). In response to the request, the server may send a GTM identifier (GTM ID) to the client. For example, clients that are located in the same geographic region or that share an Internet service provider (ISP) may be assigned the same GTM ID. To access the service, the client may modify a hostname of the desired service with the GTM ID, thereby generating a modified hostname. For example, the hostname www.service.com may be modified with the GTM ID "GTMID" to generate a modified hostname "GTMID.www.service.com." When the client submits the modified hostname to a domain name system (DNS) resolver, the DNS resolver passes the modified hostname to the server, and the server may identify a data center of the service based on the GTMID embedded in the modified hostname. For example, the identified data center may be chosen because it is geographically close to the geographic region represented by the GTM ID. Data identifying the chosen data center may be provided to the client, and the client may access the service at the chosen data center.

In a particular embodiment, a system includes a web interface, a domain name system interface, a processor, and a memory storing instructions executable by the processor. The instructions are executable by the processor to receive a request from a client via the web interface and to send a global traffic management identifier to the client via the web interface in response to the request from the client. The global traffic management identifier is determined based on a network address of the client. The instructions are also executable by the processor to receive a second request via the domain name system interface from a domain name system server, where the second request includes a modified hostname that identifies a hostname of the service and the global traffic management identifier. The instructions are further executable by the processor to identify a data center associated with the service based on the modified hostname of the service, where the identified data center is useable by the client to access the service. Data identifying the data center is sent to the domain name system server and forwarded to the client.

In another particular embodiment, a method includes receiving a request from a client at a server. The method also includes sending a global traffic management identifier in response to the request from the client. The global traffic management identifier is determined based on an attribute of the client. The method further includes, in response to the client requesting access to the service based on a modified hostname of the service, identifying a data center associated with the service based on the modified hostname of the service. The modified hostname includes the global traffic management identifier. The identified data center is useable by the client to access the service.

In another particular embodiment, a computer-readable medium includes instructions that, when executed by a computer, cause the computer to send a first request from a client to a server, where the first request identifies a service. The instructions are also executable by the computer to receive, from the server, a global traffic management identifier that is determined based on the service and based on a network address of the client. The instructions are further executable by the computer to generate a modified hostname of the service by modifying a hostname of the service with the global traffic management identifier and to access the service based on the modified hostname of the service.

Figure 1:
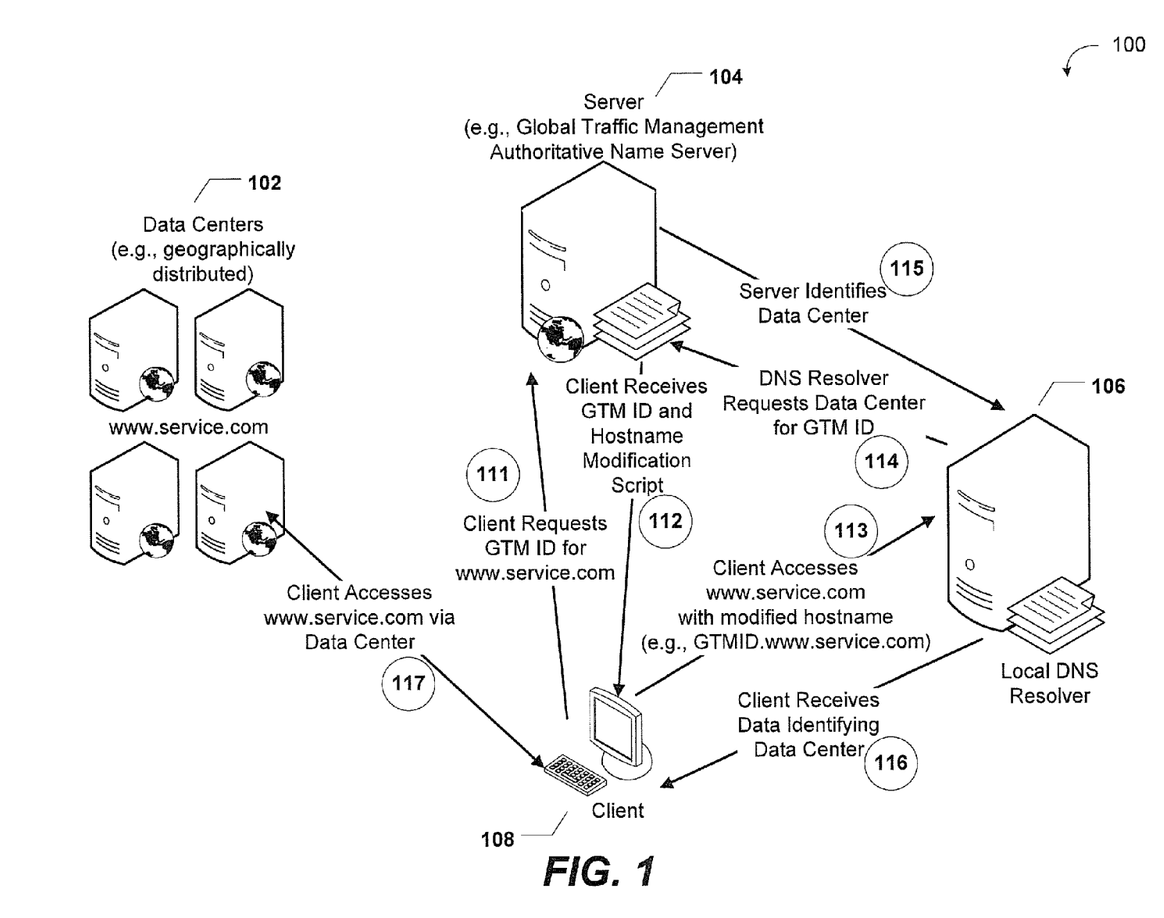
FIG. 1 is a diagram to illustrate a particular embodiment of a system to perform global traffic management using modified hostnames.

Referring to FIG. 1, a particular illustrative embodiment of a system 100 that provides global traffic management is disclosed. The system 100 includes a server 104, a local domain name system (DNS) resolver 106, and a plurality of data centers 102 that support a plurality of client computers. While only a single representative client computer 108 is shown in FIG. 1, it should be understood that a plurality of client computers may access the data centers 102, the server 104, and the local DNS resolver 106. In a particular embodiment, the server 104 communicates with the client computer 108 via a programmable interface (e.g., a web interface) and communicates with the local DNS resolver 106 via a DNS interface.

The client computer 108 includes a web browser and has access to the server 104, the DNS resolver 106, and the data centers 102 via a computer network, such as the public Internet. The client computer 108 initially sends a request for a service to be accessed. The service may be an Internet search service, a cloud computing service, a web service, or any combination thereof. For example, the client may request access to a representative service (e.g. a web service at www.service.com). The client computer 108 sends a client request 111 via the computer network to the server 104. In a particular embodiment, the server 104 is an authoritative name server and includes global traffic management (GTM) functionality. The client computer 108 sends the client request 111 to the server 104 and in response, the server 104 sends a hostname modification script and a global traffic management identifier (GTM ID) 112. In a particular embodiment, the GTM ID 112 is determined based on an attribute of the client computer 108, such as a network address (e.g., IP address), a location, or an ISP of the client computer 108. Alternately, or in addition, the GTM ID 112 may be based on the service or an attribute of the service. The client computer 108 receives the GTM ID 112 and the hostname modification script. An example of a suitable hostname modification script is a java script that is received and that is executable at the browser within the client computer 108. An example of a GTM ID is an alphanumeric string that indicates, corresponds to, or that maps to a geography or ISP of the client computer 108. To illustrate, when the client computer 108 is located in Seattle, the client computer 108 may be sent the GTM ID 112 assigned to the northwestern United States (e.g., "NWUS").

In a particular embodiment, the hostname modification script may be distributed by the service instead of the server 104. To illustrate, the service www.service.com may be a search engine. When the client computer 108 initially visits the search engine, the client computer 108 may receive a website front page that includes the host modification script. Since the initial visit is performed without a GTM ID, the front page may be received from a data center that is far away from the client computer 108 or that has a high latency with respect to the client computer 108. Thus, a size of the front page may be kept relatively small to reduce waiting time at the client computer 108. For example, the front page of the search engine may merely include a background image and a search field. Prior to or during subsequent (e.g., more data-intensive) accesses, such as search query submission and search result retrieval, the client computer 108 may execute the hostname modification script to identify and connect to a different data center that is closer to the client computer 108 or that has a lower latency with respect to the client computer 108.

Generally, the GTM ID 112 does not include information indicating which of the data centers 102 is "best" for the client computer 108. Rather, the GTM ID 112 identifies which clients to aggregate together for the purposes of global traffic management. Thus, the GTM ID 112 may have a longer validity period than a single DNS resolution response.

The hostname modification script is operable, when executed by the client computer 108, to create a modified hostname associated with the service requested by the client. For example, the hostname modification script may modify a uniform resource locator (URL) associated with the service by adding the GTM ID 112 to the URL of the hostname. For example, the modified hostname generated by the hostname modification script for the service at "www.service.com" may be changed to the modified hostname "GTMID.www.service.com" (e.g., "NWUS.www.service.com"). Alternatively, the modified hostname may have a different format or may be a different name or use different text as long as the GTM ID 112 is indicated by, included in, or otherwise recoverable from the modified hostname.

When the client computer 108 subsequently requests access to the service, the client computer 108 sends the modified hostname in the subsequent request 113 to the local DNS resolver 106. The local DNS resolver 106, based on information associated with the client computer 108 and in response to the subsequent request 113, sends a DNS resolver request 114 to the server 104. In a particular example, the DNS resolver 106 sends a request to the server 104 in order to request an identifier of a particular data center that is to be used to support the requested service (e.g., www.service.com) for the client computer 108. The server 104 responds to the DNS resolver request 114 and provides an identifier of a particular data center via a response message 115. The identified data center corresponds to a particular one of the plurality of available data centers 102. In a particular embodiment, the data centers 102 are geographically distributed and each of the data centers supports the service (e.g., www.service.com). The server 104 assigns a particular data center of the plurality data centers 102 based on the GTM ID 112. For example, the server 104 may extract the GTM ID 112 from the modified hostname in the DNS resolver request 114 and may choose the particular data center based on the extracted GTM ID 112.

The local DNS resolver 106, in response to receiving the response message 115 from the server 104, sends data identifying the particular identified data center via a message 116 to the client computer 108. Upon receipt of the message 116 identifying the particular identified data center, the client computer 108 then sends an access request to the particular identified data center via an access request message 117. Upon sending the access request message 117, the particular identified data center of the plurality data centers 102 subsequently provides service to the client computer 108. Thus, the client computer 108 may have its service request routed to a particular data center that is in close proximity or that has other desirable characteristics for providing the service (www.service.com), as determined by the server 104 based on the GTM ID 112 assigned to the particular client computer 108. In addition, the server 104 may assign GTM IDs to various client devices to support load balancing and appropriate geographic distribution of data centers with respect to requesting client devices. For example, the server may perform load balancing by issuing particular GTM IDs to particular groups of clients (e.g., clients located in a particular geographic region or serviced by a common ISP).

The server 104 receives the GTM ID based on the modified hostname that is forwarded from the local DNS resolver 106. Thus, even though the server 104 does not receive the Internet protocol address of the client computer 108 from the local DNS resolver 106, the server 104 is able to identify an appropriate GTM ID that corresponds to the location, IP address, or other attribute of the client computer 108. For example, the GTM ID may be determined based on latitude and longitude of the client computer 108 or an Internet service provider of the client computer 108.

In the embodiment illustrated in FIG. 1, the server 104 may determine multiple sets of clients and assign GTM IDs to clients in each set. However, as the number of data centers 102 increases, it may become difficult for the server 104 to manage GTM ID assignments. In an alternate embodiment, the server 104 may request the GTM ID 112 from a second server (e.g., a GTM server) operated by an ISP that issues GTM IDs for a plurality of Internet services. For example, the ISP may have additional information regarding what clients can be aggregated together and it may be easier for an ISP to track the performance between clients and the data centers 102. In such an embodiment, the GTM ID 112 may include information regarding the client computer 108 and information related to an authority (e.g., the ISP of the client computer 108), where the authority can be queried to obtain GTM IDs. Alternatively, the server 104 may request the GTM ID 112 from a third-party global corporation that provides geo-location services.

Figure 2:
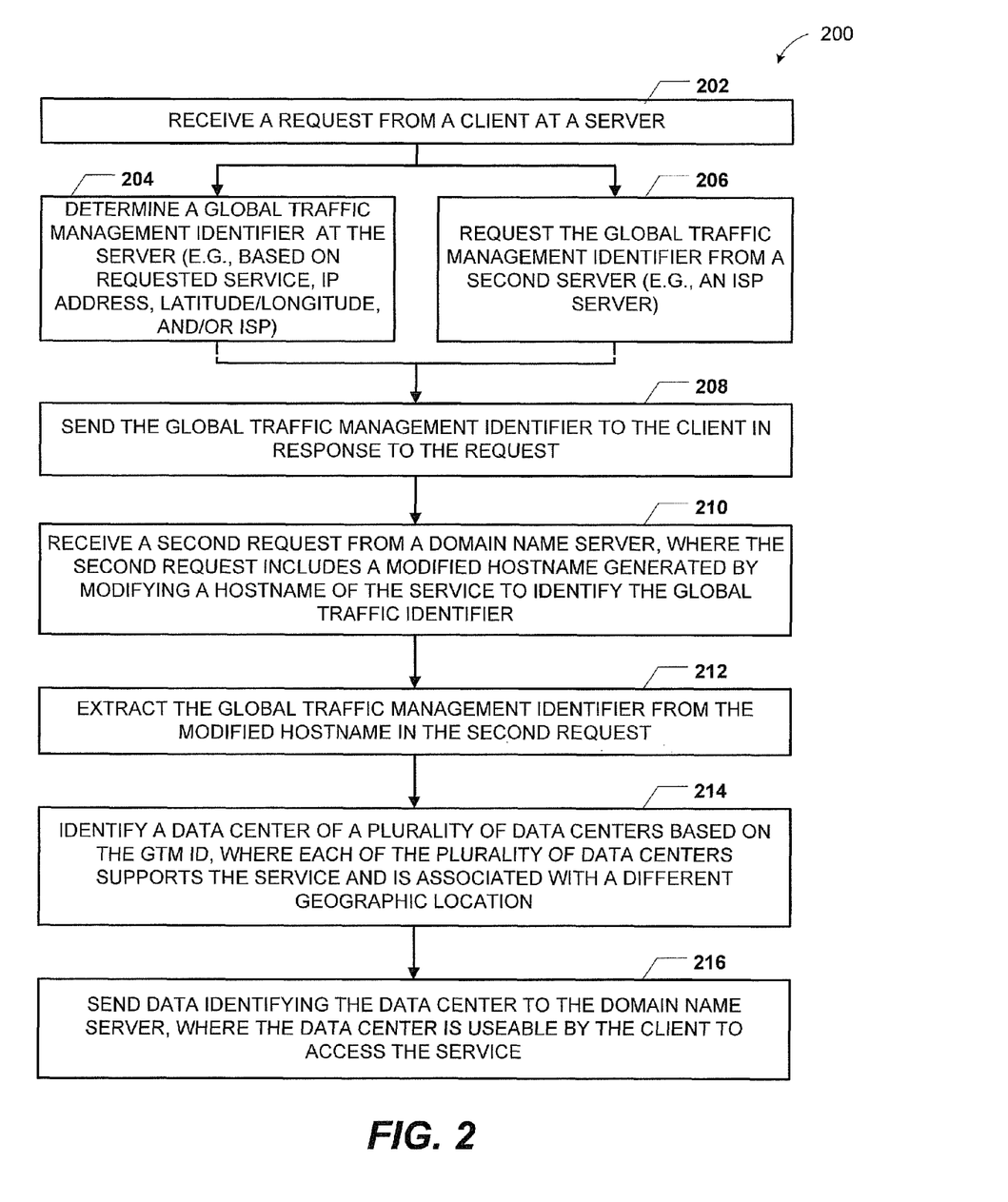
FIG. 2 is a flowchart to illustrate a particular embodiment of a method of operation at the server of FIG. 1.

Referring to FIG. 2, a particular illustrative embodiment of a method 200 of assigning GTM IDs and of performing traffic management is illustrated. In an illustrative embodiment, the method 200 may be performed at the system 100 of FIG. 1.

The method 200 includes receiving a request from a client at a server, at 202. For example, in FIG. 1, the server 104 may receive the request 111 from the computer client computer 108. The method 200 further includes identifying a global traffic management identifier in response to the request. For example, the global traffic management identifier may be determined by the server based on a requested service, an IP address of the client, a latitude and longitude of the client, an ISP of the client, or any combination thereof, at 204. Alternately, the global traffic management identifier may be requested from a second server, such as an ISP server, at 206.

The method 200 further includes sending the global traffic management identifier to the client in response to the request, at 208. For example, in FIG. 1, the server 104 may send the GTM ID 112 to the client computer 108. The method 200 includes receiving a second request from a domain name system (DNS) server, where the second request includes a modified hostname that is generated by modifying a hostname of the service to identify the GTM ID, at 210. For example, the modified hostname may be represented as "GTMID.www.service.com," as shown in FIG. 1. In a particular embodiment, the modified hostname is generated by a modification script executed at the client, as described with respect to the client computer 108 FIG. 1.

The method 200 further includes extracting the GTM ID from the modified hostname in the second request, at 212. In a particular embodiment, the GTM ID is extracted by performing text processing of the modified hostname. For example, the leftmost name "GTM ID" may be parsed from the modified hostname "GTMID.www.service.com." The method 200 includes identifying a data center of a plurality of data centers based on the GTM ID, at 214. Each of the plurality of data centers supports the service, and each of the plurality data centers may be located at a different geographic location. For example, in FIG. 1 the data centers 102 may be geographically distributed either at various locations in a country or in multiple countries. A particular data center may be assigned by a server, such as the server 104, based on the particular GTM ID 112 associated with the client computer 108. Exemplary methods of assigning clients to GTM IDs include assigning GTM IDs to clients based on internet protocol address, geographical location, internet service provider, or other grouping that is useful for traffic management and load balancing.

The method 200 also includes sending data identifying the identified data center to the DNS server, where the identified data center is usable by the client to access the service, at 216. For example, in FIG. 1, the client computer 108 may receive the message 116 that includes data identifying a particular data center of the data centers 102. Upon receiving the message 116, the client computer 108 may send the request 117 to the particular data center. Thus, an authoritative name server (e.g., the server 104 of FIG. 1) may be used to initially assign GTM IDs and may subsequently use GTM IDs for processing of service requests and routing of particular client service requests to designated data centers for service support.

Figure 3:
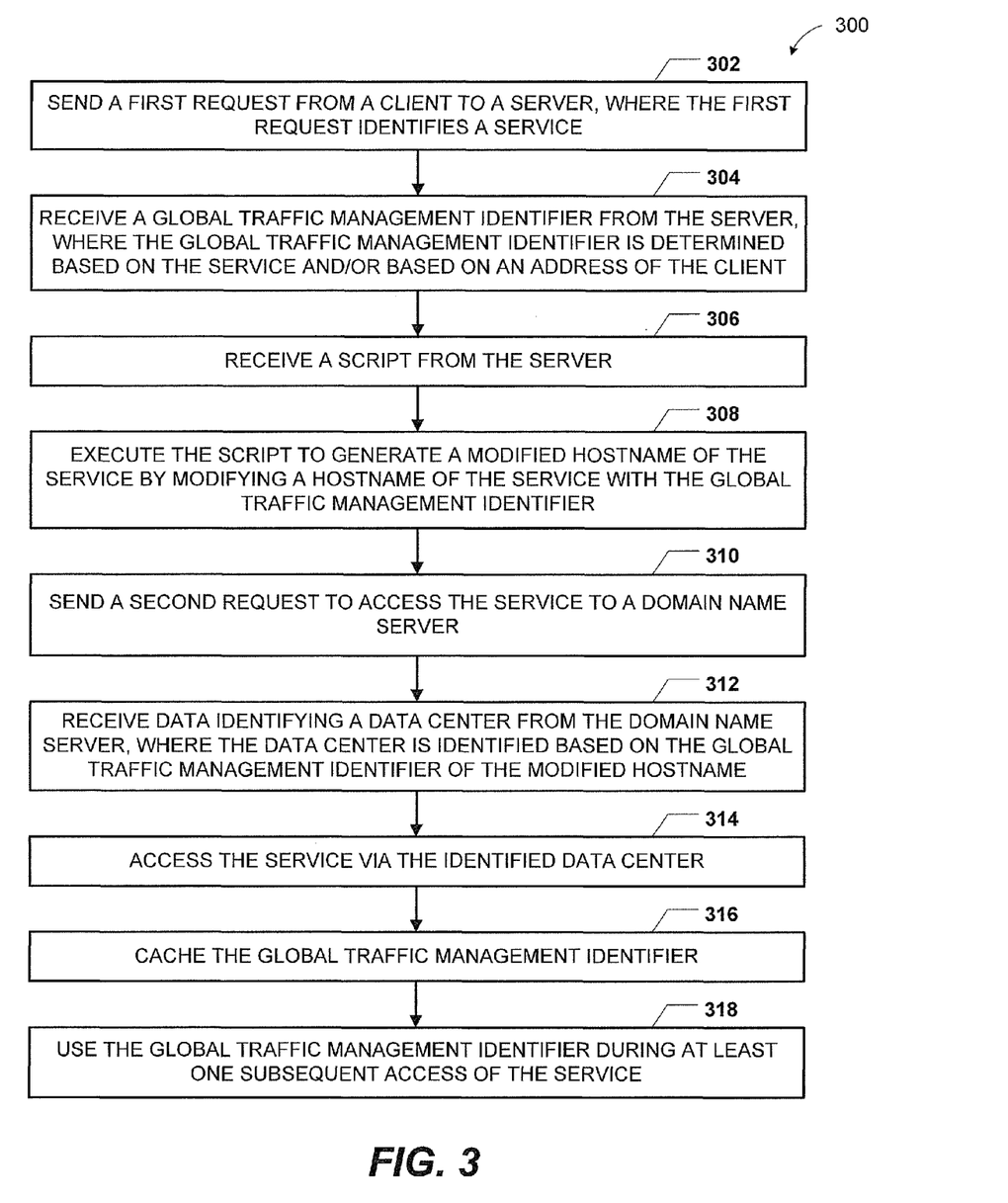
FIG. 3 is a flowchart to illustrate a particular embodiment of a method of operation at the client of FIG. 1.

Referring to FIG. 3, a particular illustrative embodiment of a method of processing a client access to a service that is supported by multiple data centers is shown and is generally designated 300. In an illustrative embodiment, the method 300 may be performed by a client of the system 100 of FIG. 1.

The method 300 includes sending a first request from a client to a server, where the first request identifies a service, at 302. For example, in FIG. 1, the client computer 108 may send the request 111 to the server 104, where the request 111 identifies the service "www.service.com." The method 300 also includes receiving a global traffic management identifier (GTM ID) from the server, at 304. The GTM ID may be determined based on the service, based on a network address or other information associated with the client, or any combination thereof, at 304. For example, in FIG. 1, the client computer 108 may receive the GTM ID 112.

The method 300 further includes receiving a script from the server, at 306, and executing the script to generate a modified hostname of the service, at 308. The script modifies a hostname of the service with the GTM ID. For example, in FIG. 1, the client computer 108 may receive the hostname modification script from the server 104 and may execute the hostname modification script. To illustrate, the hostname "www.service.com" may be modified to generate the modified hostname "GTMID.www.service.com."

The method 300 includes sending a second request to access the service to a domain name system (DNS) server, at 310. For example, in FIG. 1, the client computer 108 may send the request 113 to the local DNS resolver 106. The method 300 also includes receiving data identifying a data center from the DNS server, at 312. The data center is identified based on the GTM ID associated with the modified hostname. For example, in FIG. 1, the client computer 108 may receive the message 116, where the message 116 includes data identifying a particular data center of the data centers 102.

The method 300 further includes accessing the service via the identified data center, at 314. For example, in FIG. 1, the client computer 108 may access the service from the particular data center. The method 300 further includes caching the GTM ID, at 316, and using the GTM ID during at least one subsequent access of the service, at 318. For example, in FIG. 1, the client computer 108 may cache or otherwise store the GTM ID 112. Thereafter, the client computer 108 may continue to use the GTM ID for subsequent accesses to the service "www.service.com." In a particular embodiment, a cached GTM ID may be used multiple times until an expiration time of the GTM ID. After expiration of the GTM ID, the client computer 108 may obtain a refresh of the GTM ID by transmitting a subsequent request 111 to the server 104

Figure 4:
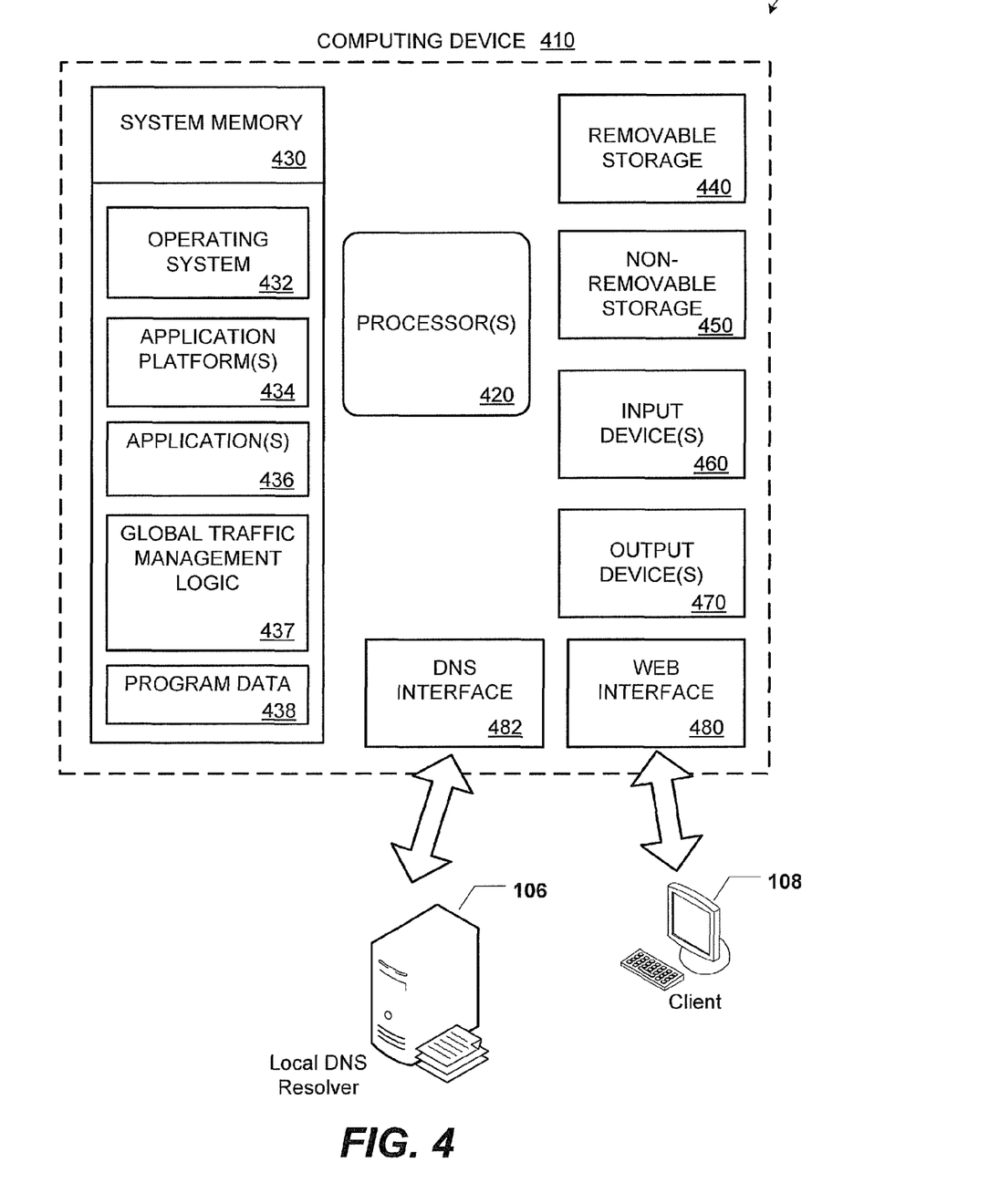
FIG. 4 is a diagram to illustrate a particular embodiment of a computing environment including a computing device to support systems, methods, and computer program products described in FIGS. 1-3.

FIG. 4 depicts a block diagram of a computing environment 400 including a computing device 410 operable to support embodiments of systems, methods, and computer program products according to the present disclosure. In an illustrative embodiment, the computing device 410 may include or implement the data centers 102 of FIG. 1, the server 104 of FIG. 1, the local DNS resolver 106 of FIG. 1, the client computer 108 of FIG. 1, components thereof, or any combination thereof. For example, the computing device 410 may implement an authoritative name server of a GTM system.

The computing device 410 includes at least one processor 420 and a system memory 430. Depending on the configuration and type of computing device, the system memory 430 may be volatile (such as random access memory or "RAM"), non-volatile (such as read-only memory or "ROM," flash memory, and similar memory devices that maintain stored data even when power is not provided), or some combination of the two. The system memory 430 typically includes an operating system 432, one or more application platforms 434, one or more applications 436, and program data 438. The system memory 430 may also include global traffic management logic 437. For example, the global traffic management logic 437 may be within an authoritative home server and may be executable by the processor 420 to identify GTM IDs, assign GTM IDs to one or more clients, and identify data centers based on GTM IDs.

The computing device 410 may also have additional features or functionality. For example, the computing device 410 may also include removable and/or non-removable additional data storage devices, such as magnetic disks, optical disks, tape devices, and standard-sized or flash memory cards. Such additional storage is illustrated in FIG. 4 by removable storage 440 and non-removable storage 450. Computer storage media may include volatile and/or non-volatile storage and removable and/or non-removable media implemented in any technology for storage of information such as computer-readable instructions, data structures, program components or other data. The system memory 430, the removable storage 440 and the non-removable storage 450 are all examples of computer storage media. The computer storage media includes, but is not limited to, RAM, ROM, electrically erasable programmable read-only memory (EEPROM), flash memory or other memory technology, compact disks (CD), digital versatile disks (DVD) or other optical storage, magnetic cassettes, magnetic tape, magnetic disk storage or other magnetic storage devices, or any other medium that can be used to store information and that can be accessed by the computing device 410. Any such computer storage media may be part of the computing device 410.

The computing device 410 may also have input device(s) 460, such as a keyboard, mouse, pen, voice input device, touch input device, etc. Output device(s) 470, such as a display, speakers, printer, etc. may also be included. The computing device 410 also contains one or more communication connections that allow the computing device 410 to communicate with other computing devices over a wired or a wireless network. The one or more communications connections may also enable communications between various virtual machines at the computing device 410. For example, the communications connections may include a web interface 480 operable to communicate with the client computer 108 and a DNS interface 482 operable to communicate with the local DNS resolver 106.

It will be appreciated that not all of the components or devices illustrated in FIG. 4 or otherwise described in the previous paragraphs are necessary to support embodiments as herein described. For example, the removable storage 440 may be optional.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Accordingly, the disclosure and the figures are to be regarded as illustrative rather than restrictive.

Those of skill would further appreciate that the various illustrative logical blocks, configurations, modules, and process steps or instructions described in connection with the embodiments disclosed herein may be implemented as electronic hardware or computer software. Various illustrative components, blocks, configurations, modules, or steps have been described generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The steps of a method described in connection with the embodiments disclosed herein may be embodied directly in hardware, in a software module executed by a processor, or in a combination of the two. A software module may reside in computer readable media, such as random access memory (RAM), flash memory, read only memory (ROM), registers, a hard disk, a removable disk, a CD-ROM, or any other form of storage medium known in the art. An exemplary storage medium is coupled to a processor such that the processor can read information from, and write information to, the storage medium. In the alternative, the storage medium may be integral to the processor or the processor and the storage medium may reside as discrete components in a computing device or computer system.

Although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments.

The Abstract of the Disclosure is provided with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments.

The previous description of the embodiments is provided to enable a person skilled in the art to make or use the embodiments. Various modifications to these embodiments will be readily apparent to those skilled in the art, and the generic principles defined herein may be applied to other embodiments without departing from the scope of the disclosure. Thus, the present disclosure is not intended to be limited to the embodiments shown herein but is to be accorded the widest scope possible consistent with the principles and novel features as defined by the following claims.

What is claimed is:

1. A method comprising:
   receiving a request from a client at a global traffic management server, the request including a hostname;
   sending, to the client, a global traffic management identifier in response to the request from the client, wherein the global traffic management identifier is determined based on an address of the client, wherein the global traffic management identifier includes an alphanumeric string that is usable by the client to be combined with the hostname to form a modified hostname, and wherein the modified hostname is generated at the client before the client submits the modified hostname to a domain name system interface for resolution; and
   in response to the client requesting access to a service based on the modified hostname, identifying a data center associated with the service based on the modified hostname.

2. The method of claim 1, further comprising:
   receiving a second request from a domain name system server, wherein the second request includes the modified hostname; and
   sending data identifying the data center to the domain name system server.

3. The method of claim 1, wherein the identified data center is one of a plurality of available data centers that support the service and wherein the global traffic management identifier is assigned to a plurality of clients.

4. The method of claim 3, wherein each of the plurality of data centers is associated with a different geographic location.

5. The method of claim 1, further comprising requesting the global traffic management identifier from a second global traffic management server.

6. The method of claim 5, wherein the second global traffic management server is operated by an interne service provider that issues global traffic management identifiers for a plurality of Internet services.

7. The method of claim 5, wherein the second global traffic management server is operated by a corporation that provides geo-location services.

8. The method of claim 1, wherein the global traffic management identifier is determined based on an Internet Protocol address of the client or based on an Internet service provider of the client.

9. The method of claim 1, wherein the global traffic management identifier is determined based on a latitude and longitude of the client.

10. The method of claim 1, wherein the global traffic management identifier expires after a predetermined time period has elapsed.

11. The method of claim 1, wherein the server is configured to perform load balancing by issuing particular global traffic management identifiers to particular groups of clients.

12. The method of claim 1, wherein the service comprises an Internet search service, a cloud computing service, a web service, or any combination thereof and wherein the global traffic management identifier is determined further based on the service.

13. A computer-readable storage device comprising instructions that, when executed by a computer, cause the computer to:
    send a first request from a client to a global traffic management server, the first request including a hostnames;
    receive, from the global traffic management server at the client, a global traffic management identifier that is based on a network address of the client, wherein the global traffic management identifier includes an alphanumeric string, and wherein the alphanumeric string is combinable with the hostname to form a modified hostname;
    generate, by the client, the modified hostname by combining the hostname with the global traffic management identifier, wherein the modified hostname is generated before the modified hostname is submitted to be resolved at a domain name system interface; and
    access a service based on the modified hostname.

14. The computer-readable storage device of claim 13, wherein the global traffic management identifier is further based on the service.

15. The computer-readable storage device of claim 13, further comprising instructions that, when executed by the computer, cause the computer to:
    send a second request to access the service to a domain name system server; and
    receive data identifying a data center from the domain name system server, wherein the data center is identified based on the modified hostname.

16. The computer-readable storage device of claim 15, further comprising instructions that, when executed by the computer, cause the computer to access the service via the identified data center.

17. The computer-readable storage device of claim 13, further comprising instructions that, when executed by the computer, cause the computer to:
    cache the global traffic management identifier; and
    use the global traffic management identifier during at least one subsequent access of the service.

18. The computer-readable storage device of claim 13, further comprising instructions that, when executed by the computer, cause the computer to:
    receive a script from the global traffic management server; and
    execute the script to generate the modified hostname.

19. A system, comprising:
    a web interface;
    a domain name system (DNS) interface;
    a processor; and
    a memory storing instructions executable by the processor to:
      receive a request from a client via the web interface, the request including a hostname;
      send a global traffic management identifier to the client via the web interface in response to the request from the client, wherein the global traffic management identifier is determined based on a service identified by the request and based on a network address of the client, wherein the global traffic management identifier includes an alphanumeric string that is usable by the client to be combined with the hostname to form a modified hostname, wherein the modified hostname is generated at the client before the client submits the modified hostname to the DNS interface for resolution;

receive a second request via the DNS interface from a DNS server, wherein the second request includes the modified hostname, the modified hostname originated from the client, and wherein the DNS server identifies information related to the service based on the global traffic management identifier;

identify a data center associated with the service based on the modified hostname; and send data identifying the data center to the DNS server.

20. The system of claim 19, wherein the processor and the memory are integrated into an authoritative name server.

* * * * *